C. ROLLIN.
PROCESS OF MAKING AMORPHOUS ANHYDROUS BARIUM HYDROXID.
APPLICATION FILED OCT. 8, 1910.
1,015,345.
Patented Jan. 23, 1912.
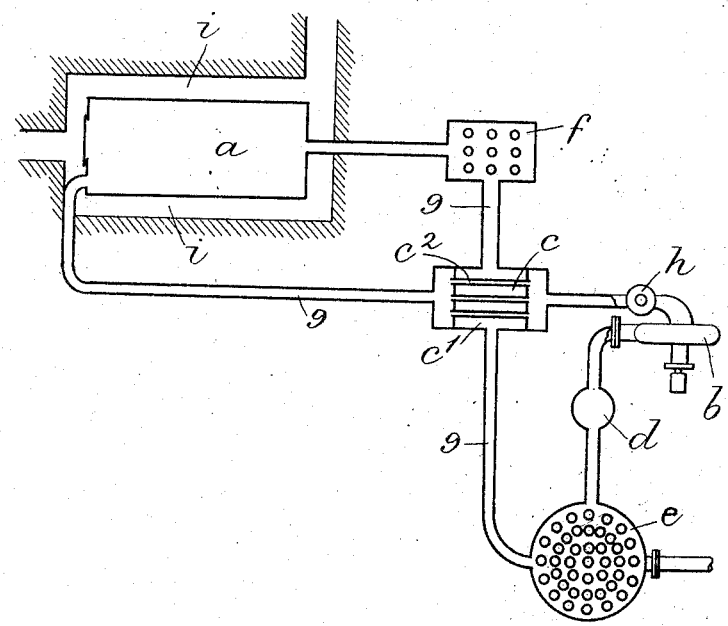
Witnesses:
Donald H. Stewart
E. V. Webster
Inventor:
Charles Rollin
By Dowell & Dowell
his Atty.

UNITED STATES PATENT OFFICE.

CHARLES ROLLIN, OF NEWCASTLE-UPON-TYNE, ENGLAND.

PROCESS OF MAKING AMORPHOUS ANHYDROUS BARIUM HYDROXID.

1,015,345.  Specification of Letters Patent.  Patented Jan. 23, 1912.

Application filed October 8, 1910. Serial No. 586,049.

*To all whom it may concern:*

Be it known that I, CHARLES ROLLIN, B. Sc., F. G. S., a subject of the King of Great Britain and Ireland, residing at Newcastle-upon-Tyne, England, have invented a new and useful Process of Making Amorphous Anhydrous Barium Hydroxid, of which the following is a specification.

This invention has for object to enable water of crystallization to be removed in an effective and convenient manner and at a comparatively low temperature from crystallized barium hydroxid in order to produce amorphous anhydrous barium hydroxid in a soft porous condition suitable for use in the manufacture of amorphous barium oxid that can be subsequently converted in an advantageous manner into barium peroxid. For attaining this object there is described in the specification of Letters Patent granted to me No. 974,993 a process consisting in slowly and uniformly heating crystallized barium hydrate at a comparatively low temperature in a partial vacuum.

Now according to the present invention, water of crystallization is removed from crystallized barium hydroxid for the purpose mentioned by melting such hydroxid in its own water of crystallization at a comparatively low temperature and under ordinary atmospheric pressure, or practically so, and causing gas that is inert to barium hydroxid to flow over the liquefied hydroxid until the water of crystallization is removed therefrom, to the desired extent and afterward removing the remaining water of crystallization therefrom by heating the mass to a low temperature in a partial vacuum. The inert gas may be caused to circulate over the liquefied barium hydroxid so that the same gas is repeatedly used, in which case means are provided for removing therefrom the moisture extracted thereby from the liquefied barium hydroxid, and means may also be provided for afterward reheating the gas before again passing it over the hydroxid undergoing treatment.

A mode of carrying out the invention will now be described by way of example and by the aid of the accompanying diagrammatic plan view.

According thereto, pure or commercially pure, crystallized barium hydroxid is melted or liquefied by heat upon the floor of a closed vessel $a$ through which previously dried inert gas, such as nitrogen or air, that is free from carbon dioxid and is hereinafter referred to as air, is caused by a circulating device, such as a fan $b$, to continuously flow at or about atmospheric pressure and at a temperature above 100° C. but below, at or only slightly above 220° C. over and in contact with the melted hydroxid so as to evaporate and carry away therewith water of crystallization from the melted hydroxid. The moist air leaving the vessel $a$ may be caused to pass through a counter current heat exchanger $c$ to the fan $b$ by which it is caused to flow through a vessel $d$ containing material, of known kind, that will absorb any carbon dioxid in the air, and thence through a dehydrating device $e$, such as a refrigerating device, wherein the moisture in the air will be removed. The dried and purified air is then caused to flow through a separate passage $c^1$ or passages in the heat exchanger $c$ wherein its temperature will be raised by conduction of heat through walls or tubes $c^2$ in the heat exchanger from the hot moist air flowing from the vessel $a$ through a separate passage or passages in the heat exchanger, for example the tubes $c^2$, after which it is caused to flow through a separate heating device $f$ wherein it is raised to the desired temperature and from which it flows back into the vessel $a$ for re-use.

If desired, the required re-heating of the dried purified air may be effected wholly by the separate heating device $f$, the heat exchanger $c$ being then dispensed with.

The several parts of the apparatus are connected together by piping $g$ so that the air travels in a closed cycle. A valve such as a check valve at $h$ serves to admit fresh air to the circuit from the external atmosphere to compensate for any leakage that may take place from the circuit. The fluid pressure in the circuit between the delivery of the fan $b$ and the vessel $a$ per square inch above atmospheric pressure will be equal to the weight of a few inches of water while there will be a slight reduction in pressure in the circuit between the vessel $a$ and the suction side of the fan. The vessel $a$ may be heated externally, as by hot gases traversing a flue or flues $i$ located below its floor or at its sides, in order to melt the crystallized barium hydroxid, or it may be heated only by the passage therethrough of the heated air; or the vessel may be heated in both of these ways, as in the example shown, but care should be taken that the temperature of the vessel and its contents shall not rise above or only slightly above 220° C. At the commencement of the operation, the crystallized barium hydroxid will melt in its water of crystallization and remain for some time at a temperature considerably below 220° C. on account of the absorption of heat that takes place during the evaporation of the water. As the water is driven off and carried away by the heated air, the temperature of the mass will rise and gradually approach that of the heated air until the mass becomes incrusted or solidified, or in a state ready to become solid. At this stage in the operation, the mass is thoroughly broken up by a suitable tool, such as a chisel. The stage at which solidification occurs as stated, represents the stage at which roughly about one molecule of the original water of crystallization remains in the solidified portion but parts of the mass that may not have quite reached this stage might contain more water. The above described heating and dehydrating process could then be continued upon the broken up mass at or about or only slightly above 220° C. until practically the whole of the water of crystallization has been removed therefrom and a soft white porous mass of amorphous anhydrous barium hydroxid left behind, which features are embodied in a division of the present application filed by me, Serial No. 647232. In order however to avoid prolonged heating of the broken up mass of barium hydroxid at a temperature at or only slightly above 220° C. for effecting practically complete removal of the water of crystallization, during which heating the mass of barium hydroxid is liable to re-act upon the material of which the vessel $x$ is composed, unless very great care be taken to prevent the temperature rising unduly, the broken up mass of partly dehydrated barium hydroxid is removed from the heating and dehydrating vessel $a$ and transferred to another closed vessel in which it is again slowly and uniformly heated at a comparatively low temperature, say between 100° C. and 200° C. and wherein a partial vacuum, corresponding to say eighteen to twenty-eight inches of vacuum is maintained, so that the remainder of the free water is slowly removed in the manner described in my Patent No. 974,993 above referred to for the treatment of crystallized barium hydroxid.

The vessel in which the crystallized barium hydroxid is melted and partly dehydrated, may be of metal, for example steel. The thickness of the mass of liquefied barium hydroxid dealt with at a time may vary but it may advantageously be of about two or three inches in thickness. The current of heated air should be caused to flow slowly and continuously over the mass of melted hydroxid and the temperature of the air admitted to the vessel should be maintained, so as to cause slow evaporation of the water and avoid sudden changes of temperature of the mass, or other irregularity of treatment, which would interfere with the obtaining of amorphous anhydrous barium hydroxid of the best quality. The time of evaporation up to the stage of incrustation or solidification, may advantageously be, for example, say about three days for an initial charge of twenty hundredweight of crystallized barium hydroxid. For the further dehydrating treatment say of the partly dehydrated barium hydroxid in a separate vessel under vacuum, the heating should be effected continuously without any drop in temperature being allowed to take place during the process, and also slowly, the time occupied being, for example, say about two days for a charge weighing about twenty hundredweight of partly dehydrated barium hydroxid.

What I claim is:—

1. A process for producing anhydrous amorphous barium hydroxid from crystallized barium hydroxid, said process consisting in causing dry inert gaseous fluid to flow over the barium hydroxid while melted in its water of crystallization and until the mass reaches the solidification stage, then breaking up the mass and afterward removing the remaining water of crystallization therefrom by heating the mass to a low temperature in a partial vacuum.

2. A process for producing anhydrous amorphous barium hydroxid from crystallized barium hydroxid, said process consisting in melting the crystallized barium hydroxid in its water of crystallization at a comparatively low temperature and at substantially ordinary atmospheric pressure, causing gaseous fluid heated to a temperature not much exceeding 220° C. to flow slowly over the liquefied barium hydroxid until the mass thereof reaches the solidification stage, then breaking up the resulting mass of partly dehydrated barium hydroxid and afterward slowly removing the remaining water of crystallization therefrom while heated at a comparatively low temperature in a partial vacuum.

3. A process for producing anhydrous amorphous barium hydroxid from crystallized barium hydroxid, said process consisting in melting the crystallized barium hydroxid in its own water of crystallization at a comparatively low temperature, causing a stream of dry gaseous fluid inert to barium hydroxid to flow continuously over the liquefied hydroxid at a comparatively low temperature, until the mass reaches the solidification stage, the gaseous fluid after leaving the hydroxid being dehydrated and then being again passed over the barium hydroxid, breaking up the mass of partly dehydrated barium hydroxid and afterward removing the remainder of the water of crystallization therefrom by heating the same to a comparatively low temperature in a partial vacuum.

4. A process for producing anhydrous amorphous barium hydroxid from crystallized barium hydroxid, said process consisting in causing dry purified air to flow slowly and at substantially atmospheric pressure over the barium hydroxid while melted in its water of crystallization, removing moisture from the air after it leaves the hydroxid, re-heating the air and again passing it over the hydroxid and continuing the operation until the mass reaches the solidification stage, breaking up the solidified mass, and afterward removing the remaining water of crystallization therefrom, by heating the same to a comparatively low temperature in a partial vacuum.

5. A process for producing anhydrous amorphous barium hydroxid from crystallized barium hydroxid, said process consisting in causing dry purified air to flow slowly, continuously and at substantially atmospheric pressure and at a temperature above 100° C. but not much exceeding 220° C. over the barium hydroxid, while melted in its own water of crystallization, until the mass reaches the solidification stage, the air after leaving the hydroxid being dehydrated, purified and re-heated and then being passed over the hydroxid, breaking up the mass of solidified barium hydroxid and removing the remaining water of crystallization therefrom while heated to a comparatively low temperature as set forth in a partial vacuum.

6. The herein described process of producing barium hydroxid in an anhydrous amorphous condition from crystallized barium hydroxid, said process consisting in melting the barium hydroxid at a low temperature in its water of crystallization and partly removing the water therefrom by slowly and continuously passing over it dry air heated to a temperature of from about 100° C. to 220° C. until the mass reaches the solidification stage, breaking up the more or less partly dehydrated and solidified mass and heating it at a temperature between 100° C. and 200° C. in a partial vacuum as set forth.

Signed at the city and county of Newcastle upon Tyne England this twenty-second day of September, 1910.

CHARLES ROLLIN.

Witnesses:
 ALEX. WARDLAW,
 FRED. H. DUKE.